Nov. 25, 1969        B. K. JEWETT        3,479,910
DEVICE FOR APPLYING SKID CHAINS TO TIRES
Filed Sept. 20, 1967
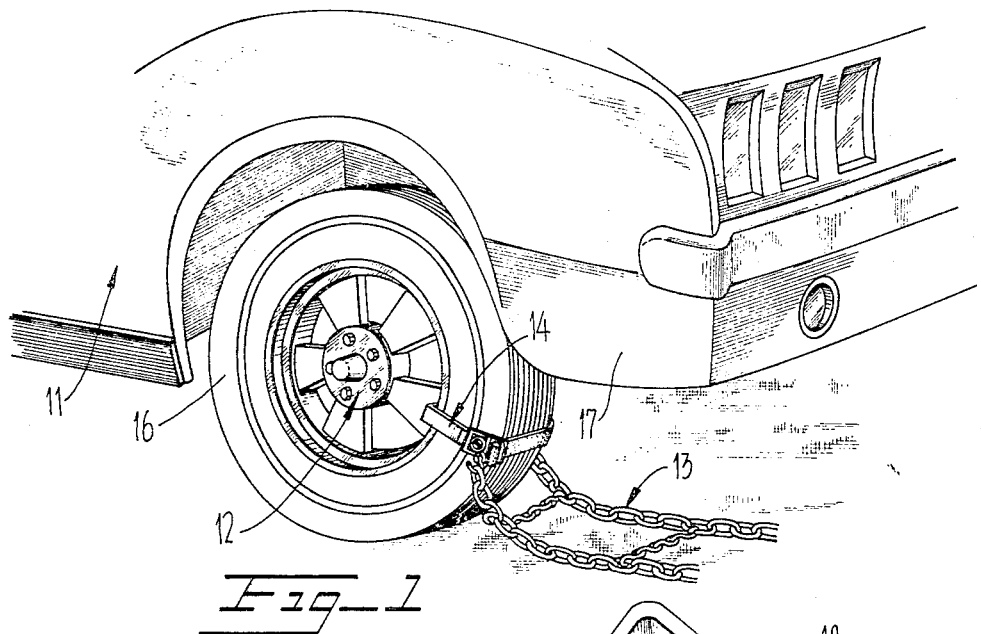
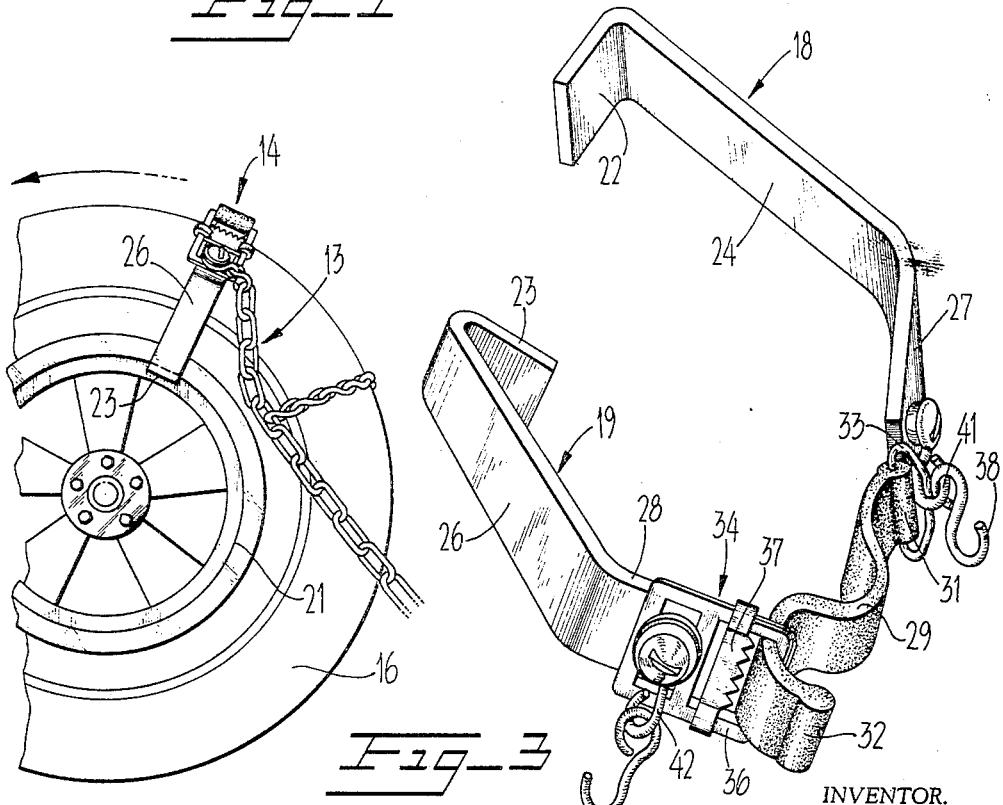
INVENTOR.
BARRY K. JEWETT
BY
*Gardner & Zimmerman*
ATTORNEYS

United States Patent Office 3,479,910
Patented Nov. 25, 1969

3,479,910
DEVICE FOR APPLYING SKID CHAINS TO TIRES
Barry K. Jewett, 270 Yulupa Ave.,
Santa Rosa, Calif. 95405
Filed Sept. 20, 1967, Ser. No. 669,150
Int. Cl. B60c 27/14
U.S. Cl. 81—15.8          7 Claims

ABSTRACT OF THE DISCLOSURE

A device which may be readily secured to the wheel and tire of a vehicle and which is adapted for the temporary attachment of one end of a skid chain thereto such that upon movement of the vehicle the remainder of the chain is positioned around the entire circumference of the tire. The opposite ends of the chain may then be hooked together and the applying device detached from the chain and removed from the wheel. The device is characterized by its adjustability and ability to be effectively attached to different sizes and shapes of tires. In addition, the device features a relatively simple quick attach-detach securing mechanism.

Background of the invention

Various devices have been devised to facilitate the ready attachment of a skid chain (actually an anti-skid chain) to a vehicle tire. Such devices typically include a strap assembly which is adapted to be clamped, or otherwise secured, transversely about the periphery of the tire at a position which is unobstructed by the fender of the vehicle. Hooks or equivalent means are carried by the strap assembly to receive the links at one end of the chain. With the end of the chain thus secured to the strap assembly the remainder of the chain is laid out behind or ahead of the wheel. The vehicle is appropriately moved forward or rearward to pull the chain about the entire circumference of the tire, and the chain is secured in position by securing the opposite ends thereof together. The device is then detached from the chain and removed from the tire.

Heretofore, chain applying devices of the type outlined above have generally been relatively complex in the mechanism employed to attach the strap assembly to the wheel. Moreover, previous strap assemblies have usually not been adjustable or otherwise arranged for effective attachment to different sizes and shapes of tires.

Summary of the invention

The present invention relates to an improved skid chain applying device which is simple in construction and yet is adjustable and adapted to effectively grip different sizes and shapes of tires. The device generally includes a pair of rigid bars adapted at one end to hook over the flanged edges of a wheel rim. The bars have generally concave innersides to conform to and engage the side walls of the tire. There is also provided an elastic strap pivotally connected with the free ends of the bars and adapted to engage transversely over the tread of the tire. The strap is secured to one of the bars by means of a slide fastener, or equivalent mechanism which permits adjustment of the effective length of the strap between the bars and therefore of the amount of tension acting to retentatively clamp the bars in engagement with the rim and tire side walls. By virtue of the resiliency and adjustability of the effective length of the strap, the device readily conforms to different sizes and shapes of tires. In addition, the strap length adjustability feature provides for quick attachment and detachment of the device. The device further includes hooks, or the like, at the free ends of the bars for facilitating temporary securance of end links of the skid chain.

Brief description of the drawing

FIGURE 1 is a perspective view of the rear end of a vehicle illustrating a device in accordance with the invention in operative association with a rear wheel to apply a skid chain thereto.

FIGURE 2 is a side elevational view of the wheel with chain applying device secured thereto.

FIGURE 3 is an enlarged perspective view of the chain applying device.

Detailed description of the preferred embodiment

Referring now to FIGURE 1 there is shown a vehicle 11 having a rear wheel 12 to which a skid chain 13 is to be secured. In order that this may be readily accomplished without jacking up the rear wheel, a chain applying device 14 in accordance with the present invention is secured to the wheel to transversely engage about the periphery of the tire 16 at a position unobstructed by the vehicle fender 17, for example a position at the lower rearward portion of the wheel. In such position the device may be readily attached to the wheel and the links at one end of the chain secured to the device with the remaining length of chain laid out behind the wheel. Upon movement of the vehicle in the forward direction to thereby rotate the wheel counterclockwise as indicated by the arrow in FIGURE 2, the chain is pulled about the entire circumference of the wheel. When the device 14 is returned to its original accessible position upon completion of one revolution of the wheel, the opposite ends of the chain may be secured together to thereby retain the chain in position upon the tire. The chain is disengaged from the device 14 and the device is detached from the wheel to complete the chain installing operation.

Considering now the device 14 in detail as to its preferred structure and referring particularly to FIGURE 3, it will be noted that the device includes a pair of rigid bars 18, 19 or equivalent members, which are adapted at one end to engage the flanged edges of the rim 21 of wheel 12 and extend radially outward therefrom with their innersides conformably engaging the side walls of tire 16. More particularly, the bars 18, 19 are respectively formed at one end with reentrant hook portions 22, 23 adapted to be hooked over the flanged rim edges. Central portions 24, 26 of the bars are outwardly inclined from the hook portions and terminate in inwardly inclined free end portions 27, 28 which are substantially parallel to and outwardly spaced from the hook portions. The innersides of the bars are thus generally concave such that when the hook portions are engaged with the flanged rim edges, the innersides substantially conformably engage the side walls of the tire.

The device 14 also includes an elastic strap 29, of rubber or equivalent resilient material, pivotally secured at its opposite ends to the free end portions 27, 28 of bars 18, 19. More particularly, the opposite ends of the strap are preferably formed with transversely enlarged cylindrical rib portions 31, 32. A link 33 pivotally secured to the free end portion 27 of one bar 18 extends loosely through one rib portion 31 of the strap to thus provide a pivotal connection therebetween. The free end portion 28 of the other bar 19 is provided with a slide fastener 34 through which the end of the strap adjacent the rib portion 32 extends. More particularly, the fastener includes a rectangular frame 36 secured to free end portion 28 having a serrated slide 37 mounted for translation therein. The strap extends through the space between the serrated edge of the slide and opposed end of the frame and the rib portion 32 is engageable with the slide and opposed end of the frame to prevent withdrawal of the strap from the fastener. The slide may be moved away from the strap to free same for movement through the fastener, or urged into engagement with the strap to thus lock the position thereof relative to the fastener. In this manner the effective length of the strap between the free end portions of the bars may be selectively varied.

To complete the device 14, hooks 38, 39 are respectively secured to free end portions 27, 28 of bars 18, 19 as by means of links 41, 42. The hooks 38, 39 serve to engage end links of the chain 13 in order to temporarily secure the chain to the applying device.

With the drive 14 provided as described in detail hereinbefore, it will be appreciated that the device may be quickly and easily attached to the wheel 12 by engaging the hook portions 22, 23 of bars 18, 19 over the opposite flanged rim edges of the wheel, the strap 29 being extended across the tread of the tire 16. The strap is then cinched tight by pulling same through the slide fastener 34 to a suitable taut position and locking the strap in place by means of the slide 37. The links at one end of the skid chain 13 are engaged with the hooks 38, 39 and thereafter the chain is applied about the entire circumference of the tire by moving the vehicle in the manner previously described. After the chain is disengaged from the hooks 38, 39, the device may be quickly detached from the wheel by releasing the side 37 from the strap to free the latter for movement through the fastener 34 to an extended position. The tension between the bars is thus released such that the hook portions 22, 23 thereof may be readily disengaged from the rim of the wheel. As previously noted, the resiliency of the strap and adjustability of its effective length between the bars enables the device to be effectively engaged upon tires of different shapes and sizes.

What is claimed is:

1. A skid chain applying device comprising a pair of rigid members having means at one end for releasable securance to the opposite side edges of the rim of a vehicle wheel with the free ends of the members extending radially outward from the rim and adapted to engage the opposite side walls of a tire mounted on the rim, an adjustable elastic strap secured between the free ends of said members adapted to transverse the tread of said tire, and means carried by said members of securing an end of a skid chain thereto.

2. A device according to claim 1, further defined by said strap being pivotally secured at one end of one of said members, and releasable fastener means carried by the free end of the other of said members for securing said strap thereto at positions of different effective length of said strap between the free ends of said members.

3. A device according to claim 1, further defined by said rigid members comprising bars, each having a reentrant hook portion at one end adapted to engage the flanged side edge of said rim, a central portion outwardly inclined from said hook portion, and a free end portion inwardly inclined from said central portion in substantially parallel outwardly spaced relation to said hook portion.

4. A device according to claim 3, further defined by said strap being pivotally secured at one end to said free end of a first of said bars, and releasable fastener means carried by said free end of a second of said bars for securing said strap thereto at positions of different effective length of said strap between said free ends of said bars.

5. A device according to claim 4, further defined by said fastener means comprising a rectangular frame secured to the free end of said second bar, and a slide mounted for translation within said frame and having a serrated edge, said strap extending between said serrated edge of said slide and an opposing end of said frame.

6. A device according to claim 5, further defined by said strap having transversely enlarged cylindrical rib portions at its opposite ends, and a link pivotally secured to said free end of said first bar and extending freely through one of said rib portions.

7. A device according to claim 6, further defined by the skid chain securing means comprising a pair of hooks respectively secured to said free ends of said bars.

References Cited

UNITED STATES PATENTS

| | | | |
|---|---|---|---|
| 1,372,195 | 3/1921 | Rounds | 81—15.8 X |
| 2,279,108 | 4/1942 | Clifford | 81—15.8 |
| 3,188,893 | 6/1965 | Webb et al. | 81—15.8 |

ROBERT C. RIORDON, Primary Examiner

R. V. PARKER, JR., Assistant Examiner